US011403556B2

(12) United States Patent
Kennedy et al.

(10) Patent No.: US 11,403,556 B2
(45) Date of Patent: Aug. 2, 2022

(54) AUTOMATED DETERMINATION OF EXPRESSIONS FOR AN INTERACTIVE SOCIAL AGENT

(71) Applicant: Disney Enterprises, Inc., Burbank, CA (US)

(72) Inventors: James R. Kennedy, Glendale, CA (US); Jill Fain Lehman, Pittsburgh, PA (US); Kevin El Haddad, Mons (BE); Douglas A. Fidaleo, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 771 days.

(21) Appl. No.: 16/374,478

(22) Filed: Apr. 3, 2019

(65) Prior Publication Data

US 2020/0320427 A1 Oct. 8, 2020

(51) Int. Cl.
*G06N 20/00* (2019.01)
*G06F 16/2457* (2019.01)
*G06N 3/08* (2006.01)

(52) U.S. Cl.
CPC ....... *G06N 20/00* (2019.01); *G06F 16/24573* (2019.01); *G06N 3/08* (2013.01)

(58) Field of Classification Search
CPC ..... G06N 20/00; G06N 3/08; G06F 16/24573
USPC ........................................ 706/12, 13, 16, 25
See application file for complete search history.

(56) References Cited

U.S. PATENT DOCUMENTS

| 9,665,831 | B2 * | 5/2017 | Gaucher | G06N 20/00 |
| 9,721,373 | B2 | 8/2017 | Marsella | |
| 2019/0392285 | A1 * | 12/2019 | Manaharlal Kakkad | G06Q 10/10 |
| 2020/0302019 | A1 * | 9/2020 | Hall | G10L 15/22 |

OTHER PUBLICATIONS

Park, H. W., et al. "Telling Stories to Robots: The Effect of Backchanneling on a Child's Storytelling." *Proceedings of the 2017 ACM/IEEE International Conference on Human-Robot Interaction*, 2017. pp. 100-108.

(Continued)

*Primary Examiner* — Thjuan K Addy
(74) *Attorney, Agent, or Firm* — Farjami & Farjami LLP

(57) ABSTRACT

A system providing an interactive social agent can include a computing platform having a hardware processor and a memory storing a training content standardization software code configured to receive content depicting human expressions and including annotation data describing the human expressions from multiple content annotation sources, generate a corresponding content descriptor for each content annotation source to translate the annotation data into a standardized data format, and transform the annotation data into the standardized data format using the corresponding content descriptor. The content and the annotation data in the to standardized format are stored as training data for use in training expressions for the interactive social agent. The memory may also store a character remapping software code configured to receive data identifying an expression for the interactive social agent, identify a character persona of the interactive social agent, and determine a modified expression based on expressive idiosyncrasies of the character persona.

20 Claims, 9 Drawing Sheets

(56) References Cited

OTHER PUBLICATIONS

Sadoughi, N., et al. "Creating Prosodic Synchrony for a Robot Co-Player in a Speech-Controlled Game for children." *Proceedings of the 2017 ACM/IEEE International Conference on Human-Robot Interaction*, 2017. pp. 91-99.

https://github.com/A2Zadeh/CMU-MultimodalSDK, Accessed Sep. 20, 2018. pp. 1-4.

Morency, LP., de Kok, I. & Gratch, J. Auton Agent Multi-Agent Syst (2010) 20: 70. https://doi.org/10.1007/s10458-009-9092-y.

T. Alshkar, B, et al. "Spontaneous Expression Detection from 3D Dynamic Sequences by Analyzing Trajectories on Grassmann Manifolds," *IEEE Transactions on Affective Computing*, vol. 9, No. 9, No. 2, Apr. 2018. pp. 271-284.

Turker, B., et al. "Audio-Facial Laughter Detection in Naturalistic Dyadic Conversations." *IEEE Transactions on Affective Computing*, Sep. 2017 pp. 534-545.

Hagerer, G., et al. "Robust Laughter Detection for Wearable Wellbeing Sensing." *Proceedings of the 2018 International Conference on Digital Health*, Apr. 2018. pp. 156-157.

Ishii, R., et al. "Automatic Generation of Head Nods Using Utterance Texts." *Proceedings of the 27th IEEE International Symposium on Robot and Human Interactive Communication*, 2018. pp. 1143-1149.

Balayn, A., et al. "Data-Driven Development of Virtual Sign Language Communication Agents." *Proceedings of the 27th IEEE International Symposium on Robot and Human Interactive Communication*, 2018. pp. 370-377.

Haddad, K.E., et al. "Towards a listening agent: a system generating audiovisual laughs and smiles to show interest." *ICMI*, 2016. pp. 248-255.

Cui, D., et al. "ELM based smile detection using Distance Vector." Pattern Recognition, 79, 2018. pp. 356-369.

\* cited by examiner

AUTOMATED DETERMINATION OF EXPRESSIONS FOR AN INTERACTIVE SOCIAL AGENT

BACKGROUND

Advances in artificial intelligence have led to the development of a variety of devices providing one of several dialogue-based interfaces, such as GOOGLE HOME™, AMAZON ALEXA™, and others. However, the dialogue interfaces to provided by these and similar devices tend to lack character and naturalness. Moreover, these devices and the dialog interfaces provided by the conventional art are typically transactional, and indicate to a user that they are listening for a communication from the user by responding to an affirmative request by the user. In contrast to such transactional interactions, natural communications between human beings are more nuanced and include the use of nonverbal, as well as verbal expressions. Consequently, there is a need in the art for an automated solution capable of interpreting contextual inputs in order to determine naturalistic expressions for use by an interactive social agent in communicating with a user.

SUMMARY

There are provided systems and methods for performing automated determination of expressions for an interactive social agent, substantially as shown in and/or described in connection with at least one of the figures, and as set forth more completely in the claims.

DETAILED DESCRIPTION

Figure 1:
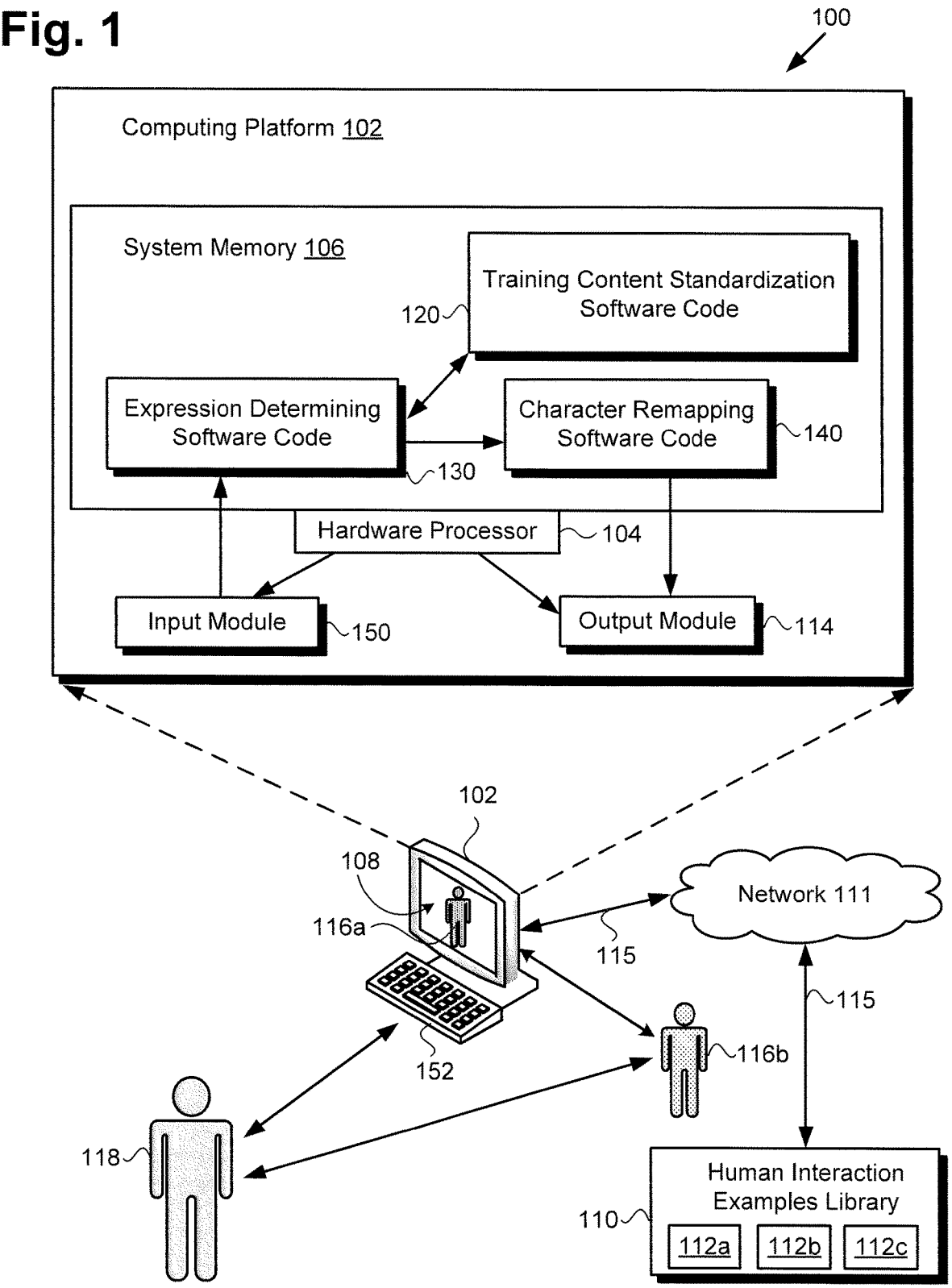
FIG. 1 shows a diagram of a system providing an interactive social agent, according to one exemplary implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

As stated above, advances in artificial intelligence have led to the development of a variety of devices providing one of several dialogue-based interfaces. However, the dialogue interfaces provided by such devices tend to lack character and naturalness, at least in part because they are transactional, and indicate to a user that they are listening for a communication from the user by responding to a request by the user. By contrast, natural communication between human beings is more nuanced and includes the use of nonverbal, as well as verbal expressions.

The present application is directed to automated systems and methods that address and overcome the deficiencies in the conventional art. The solutions disclosed in the present application advantageously enable the interpretation of contextual inputs in order to perform an automated determination of naturalistic expressions for use by an interactive social agent in communicating with a user. It is noted that, as used in the present application, the terms "automation," "automated", and "automating" refer to systems and processes that do not require human intervention. Although, in some implementations, a human editor may review or even modify interactive social agent expressions determined by the systems and using the methods described herein, that human involvement is optional. Thus, the methods described in the present application may be performed under the control of hardware processing components of the disclosed automated systems.

It is further noted that, as used in the present application, the term "interactive social agent" refers to a non-human communicative entity rendered in hardware and software that is designed for expressive interaction with a human user. In some use cases, an interactive social agent may take the form of a virtual character rendered on a display (i.e., interactive social agent 116a rendered on display 108, in FIG. 1) and appearing to watch and listen to a user in order to initiate a conversation with the user and/or to respond to a communicative user input. In other use cases, an interactive agent may take the form of a machine (i.e., interactive social agent 116b, in FIG. 1), such as a robot for example, appearing to watch and listen to the user in order to initiate a conversation with the user and/or to respond to a communicative user input. Alternatively, an interactive social agent may be implemented as an automated voice response (AVR) system, or an interactive voice response (IVR) system, for example.

FIG. 1 shows a diagram of system 100 providing an interactive social agent, according to one exemplary implementation. As shown in FIG. 1, system 100 includes computing platform 102 having hardware processor 104, input module 150 including keyboard 152, output module 114 including display 108, and system memory 106 implemented as a non-transitory storage device. According to the present exemplary implementation, system memory 106 stores training content standardization software code 120, expression determining software code 130, and character remapping software code 140. In addition, FIG. 1 shows interactive social agents 116a and 116b instantiated by expression determining software code 130 and/or character remapping software code 140, when executed by hardware processor 104.

As further shown in FIG. 1, system 100 is implemented within a use environment including communication network 111 providing network communication links 115, human interaction examples library 110, and user 118 in communication with one or both of interactive social agents 116a and 116b. Also shown in FIG. 1 are distinct compilations of annotated content accessible on human interaction examples library 110 and shown as content annotation sources 112a, 112b, and 112c (hereinafter also "corpus 112a", "corpus 112b", and corpus 112c" and/or "corpora 112a-112c").

It is noted that, although the present application may refer to one or more of training content standardization software code 120, expression determining software code 130, and character remapping software code 140 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts training content standardization software code 120, expression determining software code 130, and character remapping software code 140 as being co-located in system memory 106, that representation is also merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100.

Thus, in some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution network. Consequently, in some implementations, training content standardization software code 120, expression determining software code 130, and character remapping software code 140 may be stored remotely from one another on the distributed memory resources of system 100.

Alternatively, when implemented as a personal computing device, computing platform 102 may take the form of a desktop computer, as shown in FIG. 1, or any other suitable mobile or stationary computing system that implements data processing capabilities sufficient to support connections to communication network 111, provide a user interface, and implement the functionality ascribed to computing platform 102 herein. For example, in other implementations, computing platform 102 may take the form of a laptop computer, tablet computer, or smartphone, for example, providing display 108. Display 108 may take the form of a liquid crystal display (LCD), a light-emitting diode (LED) display, an organic light-emitting diode (OLED) display, or another suitable display screen that performs a physical transformation of signals to light.

It is also noted that although FIG. 1 shows input module 150 as including keyboard 152, output module 114 as including display 108, and both input module 150 and output module 114 as residing on computing platform 102, those representations are merely exemplary as well. In other implementations including an all-audio interface, for example, input module 150 may be implemented as a microphone, while output module 114 may take the form of a speaker. Moreover, in implementations in which interactive social agent 116b takes the form of a robot or other type of machine, input module 150 and/or output module 114 may be integrated with interactive social agent 116b rather than with computing platform 102. In other words, in some implementations, interactive social agent 116b may include input module 150 and/or output module 114.

Although FIG. 1 shows user 118 as a single user, that representation too is provided merely for conceptual clarity. More generally, user 118 may correspond to multiple users concurrently engaged in communication with one or both of interactive social agents 116a and 116b via system 100.

Figure 2A:
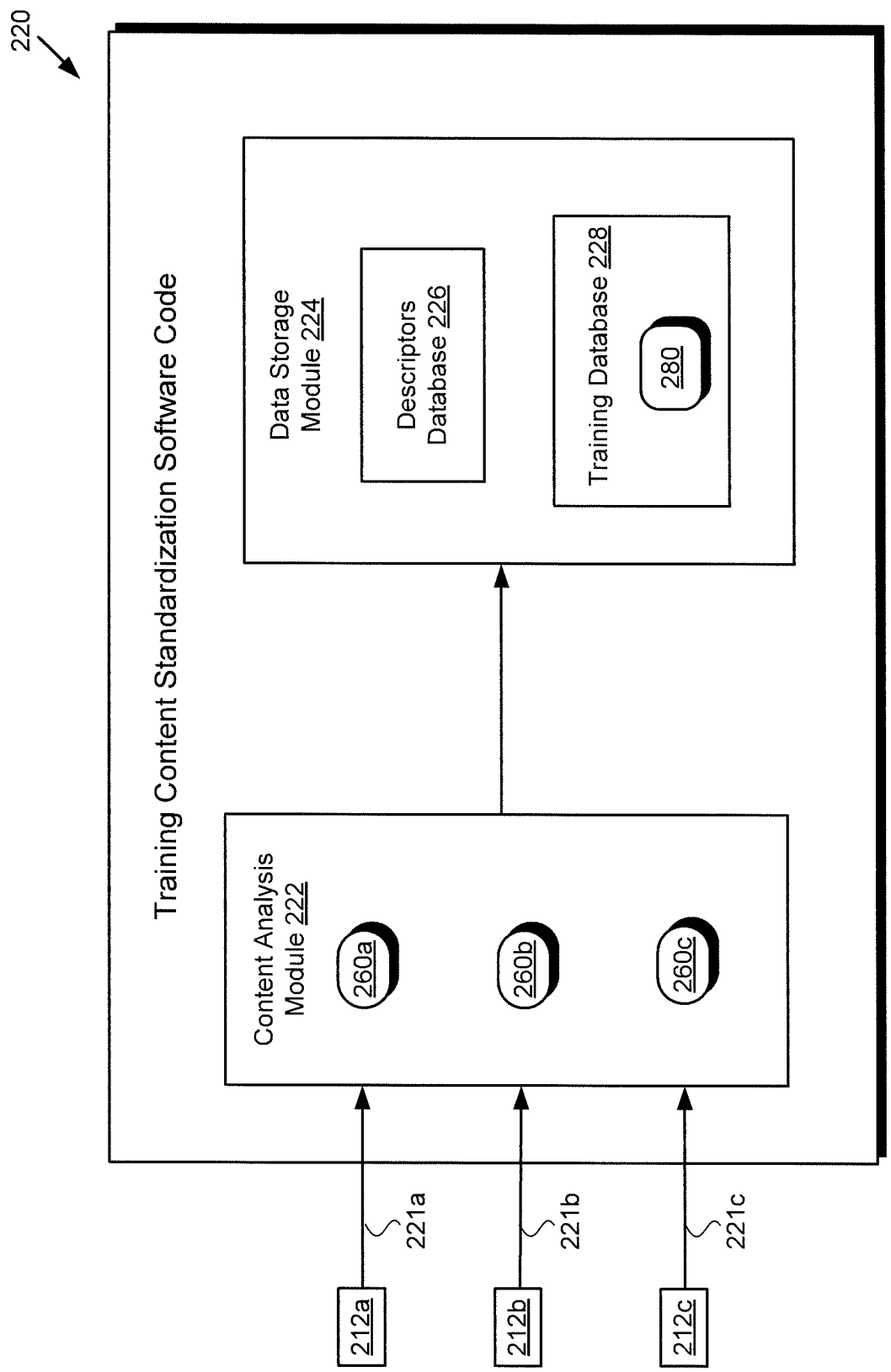
FIG. 2A shows a more detailed diagram of a training content standardization software code suitable for use in a system providing an interactive social agent, according to one implementation.

FIG. 2A shows exemplary training content standardization software code 220 suitable for execution by hardware processor 104 of system 100, in FIG. 1, according to one implementation. As shown in FIG. 2A, training content standardization software code 220 may include content analysis module 222 and data storage module 224. As further shown in FIG. 2A, content analysis module 222 is configured to receive content 221a, 221b, 221c from respective content annotation sources or corpora 212a, 212b, and 212c. It is noted that content 221a, 221b, and 221c may depict human expressions and may include annotation data describing the human expressions. Content analysis module 222 is further configured to generate descriptors 260a, 260b, and 260c corresponding respectively to corpora 212a, 212b, and 212c. It is noted that descriptors 260a, 260b, and 260c are described in greater detail below. As also shown in FIG. 2A, data storage module 224 of training content standardization software code 220 includes descriptors database 226 and training database 228 including training data 280.

Training content standardization software code 220 corresponds in general to training content standardization software code 120, in FIG. 1, and those corresponding features may share any of the characteristics attributed to either corresponding feature by the present disclosure. That is to say, like training content standardization software code 220, training content standardization software code 120 may include features corresponding respectively to content analysis module 222 for generating descriptors 260a, 260b, and 260c, and data storage module 224 including descriptors database 226 and training database 228 storing training data 280. In addition, corpora 212a, 212b, and 212c correspond respectively in general to corpora 112a, 112b, and 112c, in FIG. 1, and those corresponding features may share any of the characteristics attributed to either corresponding feature by the present disclosure.

With respect to the functionality of training content standardization software code 120/220, it is noted that there are numerous existing corpora of human expressions and human-to-human interactions that could, in principle, be used for training data-driven models, such as the expression predicting artificial neural network (ANN) included in expression determining software code 130 and discussed below. However, existing corpora have been collected using different methods and at different times. As a result, existing corpora may include different recorded features (e.g., some are audio only, some are video only, and so forth) and different derived annotation labels, despite recording the same basic conversational phenomena. Consequently, it is typically challenging and costly to incorporate all desired sources of annotated content for training multi-modal data-driven models. In fact, according to the conventional art, use of multiple corpora tends to require beginning anew from the raw data level for each corpus, in order to redefine and rederive the higher level concepts of interest.

Training content standardization software code 120/220 advantageously resolves this problem in the conventional art by enabling selection of features across disparate corpora in a standardized manner, producing uniform features upon which data-driven models can be trained. That is to say, with a minimal definition of the contents of various corpora, training content standardization software code 120/220 can extract selected features from those corpora in a standardized format for use as to training data 280.

In some implementations, training content standardization software code 120/220 can be selectively used in an "expert" mode or in an "advisor" mode. When used in "expert" mode, training content standardization software code 120/220 can reflect the understanding and preferences of a particular human programmer for the features that are most relevant to their training needs. When used in "advisor" mode, training content standardization software code 120/220 can use basic statistical techniques to examine correlations among the labeled data sets included in corpora 112a/212a, 112b/212b, and 112c/212c, and proposes label equivalences and distinctions of which the programmer may be unaware. Both expert mode and advisor mode enable high-level control over the selection of data from multiple existing corpora for the purpose of training new data-driven models.

For example, in advisor mode, statistical data, such as means and standard deviations for segment lengths can be derived for all existing labels in the datasets that are loaded. These distributions can then be compared to establish which labels have a high likelihood of capturing phenomena from the same population. To further verify the accuracy of this prediction, machine learning pipelines can be used to examine whether combining the candidate homologues produces an improvement in the prediction. That is, if feature 1 of corpus 112a/212a, feature 3 of corpus 112b/212b, feature 8 of corpus 112c/212c are predicted to be the same underlying expressive feature in each corpus, then a training and testing protocol sampling from data in all of 112a/212a, 112b/212b, and 112c/212c should do better on prediction than any of feature 1 of corpus 112a/212a, feature 3 of corpus 112b/212b, or feature 8 of corpus 112c/212c alone, can do on any subset of corpora 112a/212a, 112b/212b, and 112c/212c, assuming the same training and testing protocol.

Figure 2B:
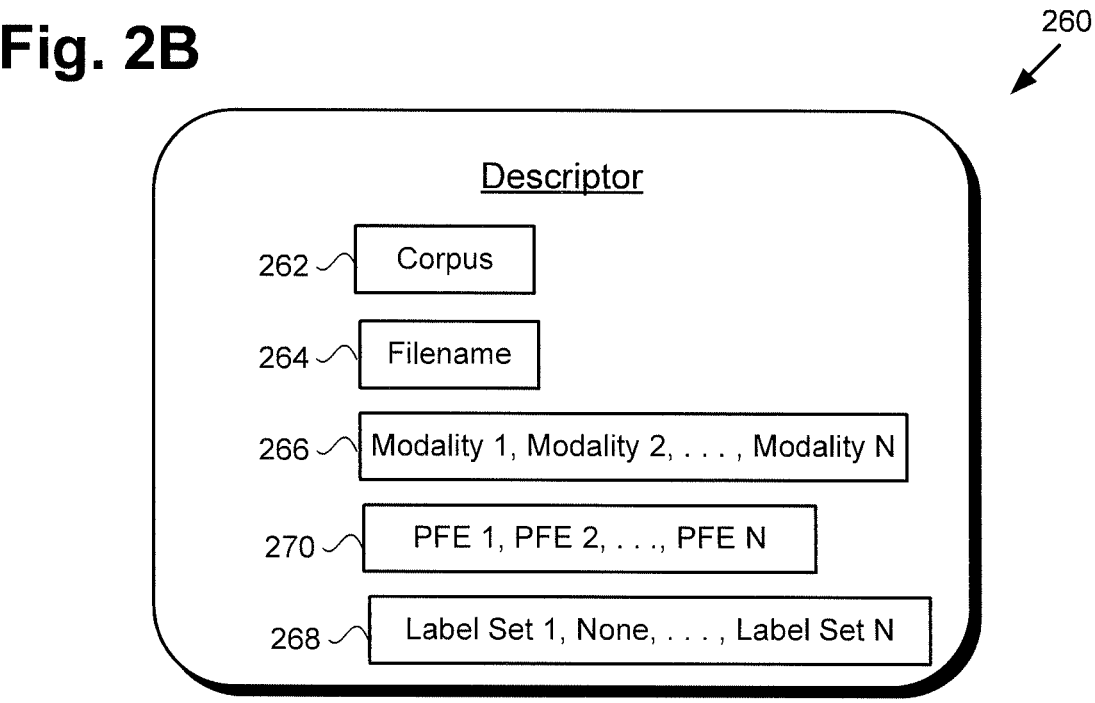
FIG. 2B shows a more detailed diagram of a content descriptor generated by and suitable for use by a training content standardization software code, according to one implementation.

FIG. 2B shows a more detailed diagram of content descriptor 260 generated by and suitable for use by training content standardization software code 120/220, according to one implementation. It is noted that descriptor 260 corresponds in general to any or all of descriptors 260a, 260b, and 260c, in FIG. 2A. Thus, descriptors 260a, 260b, and 260c may share any of the characteristics attributed to descriptor 260 by the present disclosure, and vice versa.

As shown in FIG. 2B, descriptor 260 includes classifications including a particular corpus identifier 262, filename 264, modalities 266, features represented by Path-Features-Extensions (PFEs) 270, and label sets 268 that refer to a group of values about a label type, for example, "smiles." It is noted that, in some implementations, label sets 268 may be represented by dictionaries. However, in other implementations, label sets 268 may be represented by other data structures.

As noted above, the annotated content available from human interactions example library 110 can include content in different corpora 112a/212a, 112b/212b, 112c/212c which themselves may contain different types of data. As a result, it may be advantageous or desirable to use the classifications included in descriptor 260 to describe the data as follows:

Corpus Identifier 262 can be a single string that is linked to several modalities and to filename 264.

Filename 264 can be a single string that is linked to a corpus, designating a data file in which the data are going to be stored.

Modalities 266 can be a list of strings describing the nature of the data (e.g., "audio", "video","mfcc_laugh", "33_facial_landmarks", and so forth). Each of modalities 266 is linked to a PFE.

PFEs 270: The Path-Functions-Extensions class describes the content of a modality. Each PFE can contain three main attributes: (1) a list of paths to the data concerned, (2) a list of extensions, and (3) a list of functions that will be used to process the files in the path+extension. The functions can be defined by the programmer.

It is noted that features within the content analyzed using descriptor 260 are represented by a list of PFEs and the labels corresponding to those features are represented by a list of label sets or "None" corresponding respectively to the PFEs, i.e. each features PFE must correspond to either a label set, or to None if no label is linked to the corresponding PFE. In implementations in which label sets 268 are represented by dictionaries, the keys of each dictionary are label types.

The classifications 262, 264, 266, 268, and 270 are used to generate an instance of descriptor 260. The function of descriptor 260 is to unify each modality in order to obtain a single object that will be used to describe a specific corpus identified by corpus identifier 262. Descriptors database 226 can then be built as a collection of descriptors corresponding to corpora 112a/212a, 112b/212b, and 112c/212c. Descriptors database 226 has a current descriptor (e.g., descriptor 260a), on which some methods are automatically applied and which can be modified, and stored descriptors (e.g., descriptors 260b and 260c) that can be accessed and can be used to save the whole database.

Figure 2C:
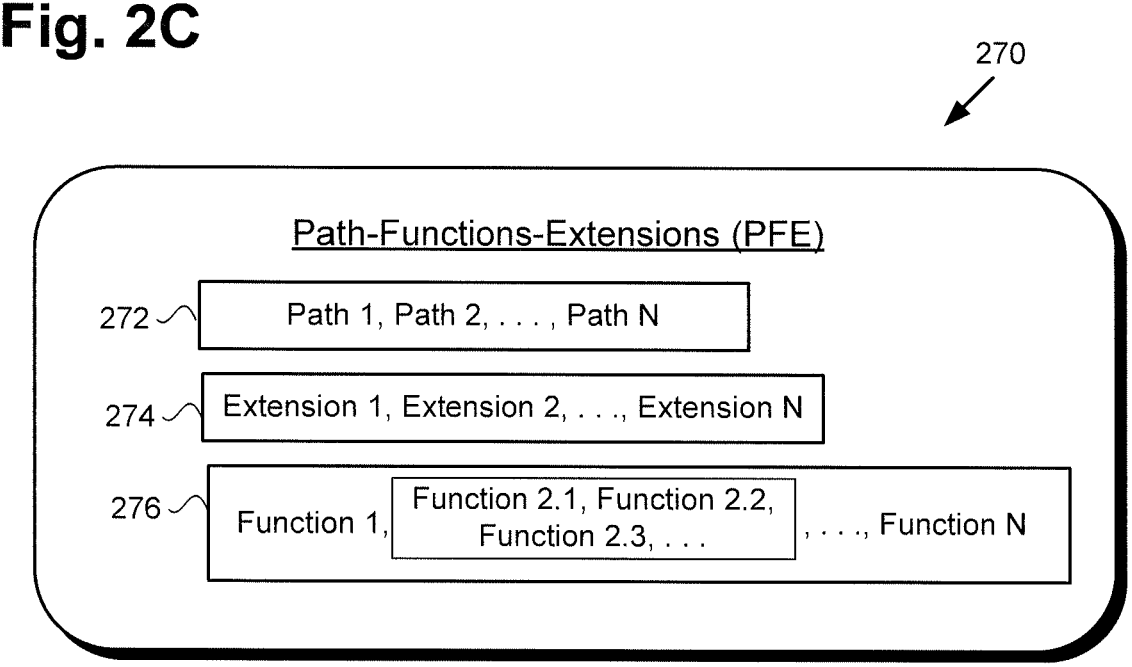
FIG. 2C shows a more detailed example of a Path-Functions-Extensions (PFE) classification suitable for use as part of a content descriptor, according to one implementation.

FIG. 2C shows a more detailed example of PFE 270 suitable for use as part of content descriptor 260, according to one implementation. PFE 270 describes data files by paths 272 and extensions 274, and describes extractions by functions 276. Paths 272 is a list of paths to the directories where the data is stored, while extensions 274 is a list of strings representing the file types of interest in the corresponding path or "None", in which case a global string automatically replaces "None" and indicates that all the files in path are of interest.

Functions 276 is a list of callables or lists of callables. The use of lists of callables is useful in managing the problem of imbalance in the number of feature files with respect to the number of corresponding label files, for example, when a corpus contains a single label file for every three audio files or every three video files. In that case, for instance, a list of three functions is used instead of a single function for a single label file to extract three different label arrays corresponding respectively to each audio or video file. Functions 276 are defined by a programmer of system 100. Each function may receive a single parameter as input, i.e., the path to a single file.

According to some implementations, those functions 276 extracting features from data files return two arrays, such as NumPy arrays for example, in a tuple, i.e., (features array, corresponding time array). However, in use cases in which a time array is not required, the time array may be returned as an empty array. In some implementations, those functions 276 extracting data from label files may return a single array, such as a single NumPy array for example, representing a single label. It is noted that functions 276 can be normal functions, class methods, or any callable having no nested locally defined functions.

Figure 2D:
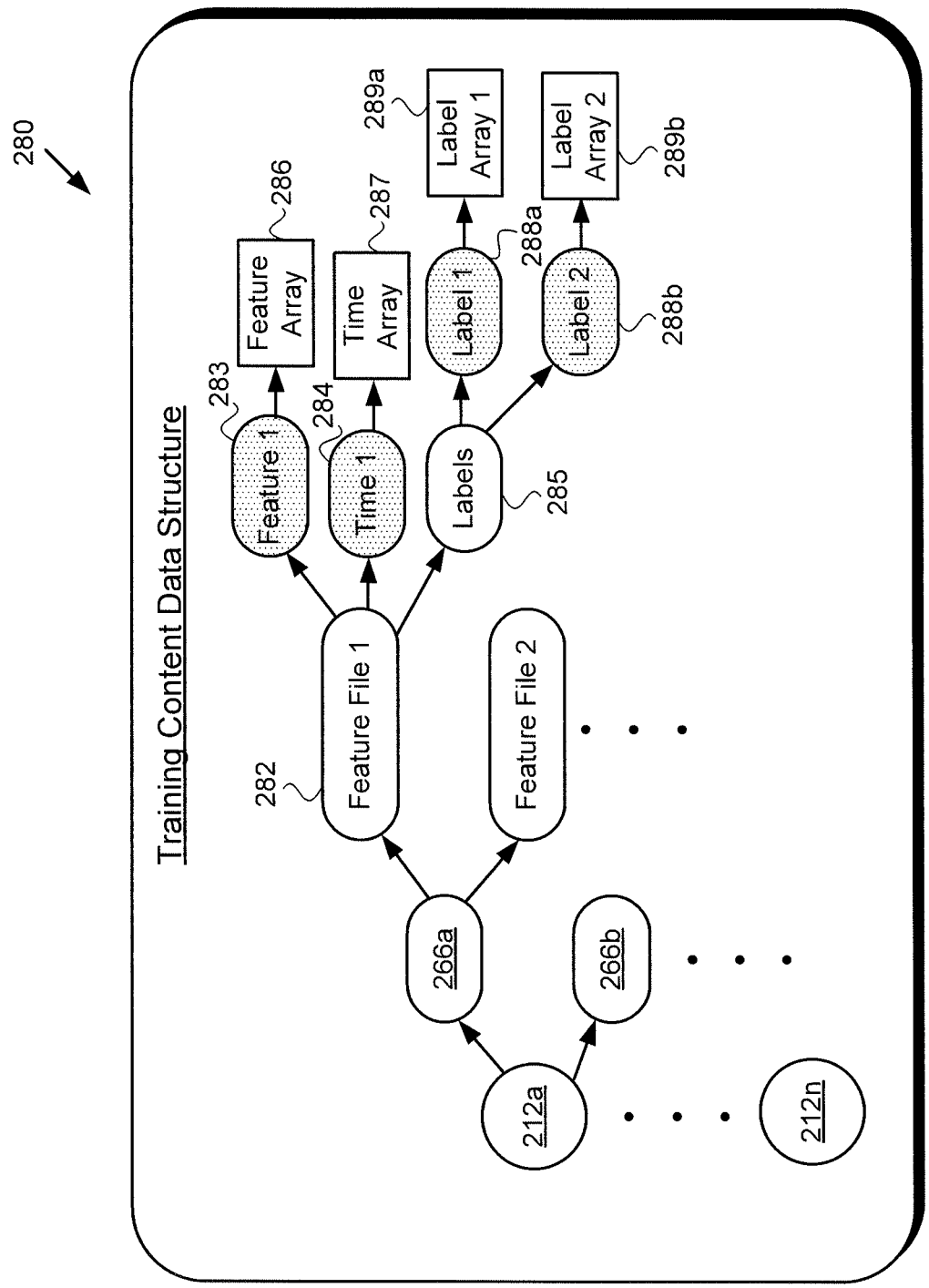
FIG. 2D shows an example of a data structure for storing training data for use in training an expression predicting artificial neural network (ANN), according to one implementation.

FIG. 2D shows an example of data structure 281 for storing training data 280 shown in FIG. 2A, according to one implementation. As shown in FIG. 2D, data structure 281 organizes data by corpora 112*a*/212*a* through 212*n*, organizes data within each corpora by modalities 266, and for each modality, segregates individual feature files for classification of its features, time information, and labels. Referring to exemplary feature file 282 of modality 266*a* of corpus 112*a*/212*a*, feature file 282 includes feature dataset 283, time dataset 284, and labels file group 285. Feature dataset 283 is further organized as feature array 286, while time dataset 284 is further organized as time array 287. Labels file group 285 includes first label dataset 288*a* and second label dataset 288*b*, each of which is further organized as label arrays, i.e., respective first label array 289*a* and second label array 289*b*.

In some implementations, data structure 281 may be saved as a Hierarchical Data Format 5 (HDF5) file, for example. Moreover, in some implementations, the contents of data structure 281 may be summarized in an Extensible Markup Language (XML) file. It is noted that in some implementations, data stored by data storage module 224 of training content standardization software code 120/220 may be stored in multiple different formats. For instance, in one implementation, such data may be stored in the three file formats HDF5, XML, and Python™ shelve.

Figure 3:
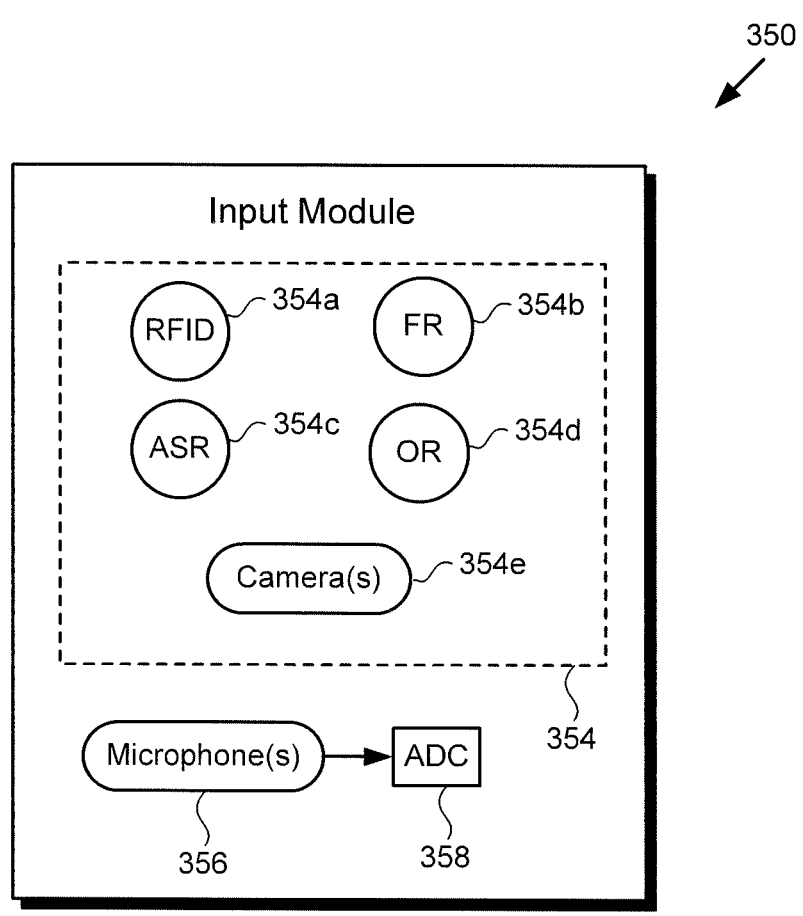
FIG. 3 shows a more detailed diagram of an input module suitable for use in a system providing an interactive social agent, according to one implementation.

FIG. 3 shows a more detailed diagram of input module 350 suitable for use in system 100, in FIG. 1, according to one implementation. As shown in FIG. 3, input module 350 includes multiple sensors 354, one or more microphones 356 (hereinafter "microphone(s) 356"), and analog-to-digital converter (ADC) 358. As further shown in FIG. 3, sensors 354 of input module 350 may include radio-frequency identification (RFID) sensor 354*a*, facial recognition (FR) sensor 354*b*, automatic speech recognition (ASR) sensor 354*c*, object recognition (OR) sensor 354*d*, and one or more cameras 354*e* (hereinafter "camera(s) 354*e*"). Input module 350 corresponds in general to input module 150, in FIG. 1. Thus, input module 150 may share any of the characteristics attributed to input module 350 by the present disclosure, and vice versa.

It is noted that the specific sensors shown to be included among sensors 354 of input module 150/350 are merely exemplary, and in other implementations, sensors 354 of input module 150/350 may include more, or fewer, sensors than RFID sensor 354*a*, FR sensor 354*b*, ASR sensor 354*c*, OR sensor 354*d*, and camera(s) 354*e*. Moreover, in other implementations, sensors 354 may include a sensor or sensors other than one or more of RFID sensor 354*a*, FR sensor 354*b*, ASR sensor 354*c*, OR sensor 354*d*, and camera(s) 354*e*. In addition to sensors 354 and microphone(s) 356, input module 150/350 may be configured to receive manual inputs from user 118 via a computer mouse or track pad, keyboard 152, or a touch screen display corresponding to display 108. It is further noted that camera(s) 354*e* may include various types of cameras, such as red-green-blue (RGB) still image and video cameras, RGB-D cameras including a depth sensor, and infrared (IR) cameras, for example.

Figure 4:
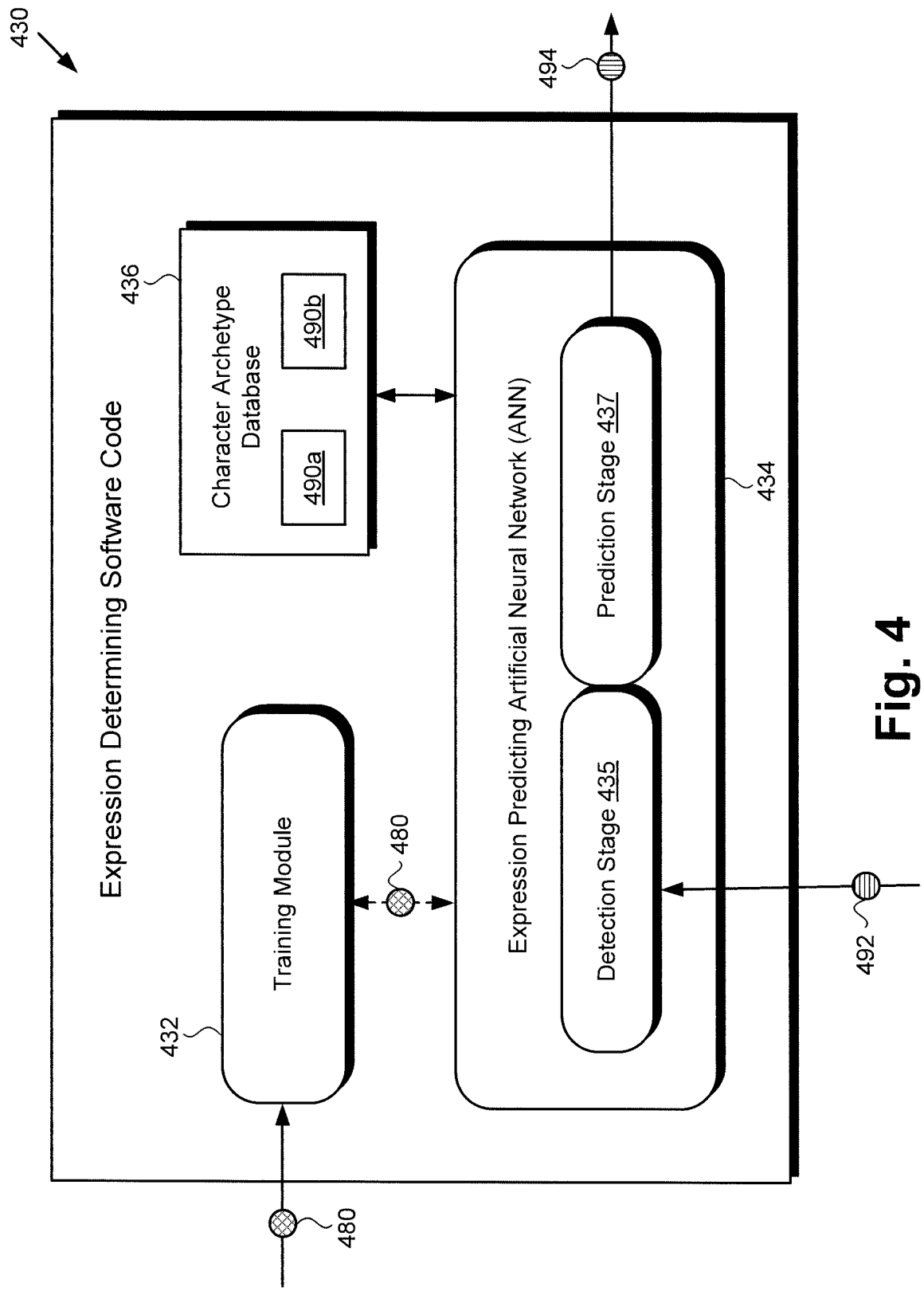
FIG. 4 shows a more detailed diagram of an expression determining software code including an expression predicting ANN and suitable for use in a system providing an interactive social agent, according to one implementation.

FIG. 4 shows exemplary expression determining software code 430 suitable for execution by hardware processor 104 of system 100, in FIG. 1, according to one implementation. As shown in FIG. 4, expression determining software code 430 may include training module 432, expression predicting ANN 434, and character archetype database 436 storing character archetypes 490*a* and 490*b*. As further shown in FIG. 4, expression predicting ANN 434 may include detection stage 435 and prediction stage 437. Also shown in FIG. 4 are training data 480, communication 492 from user 118, and expression identifying data 494 provided as an output by prediction stage 437 of expression predicting ANN 434.

It is noted that although the implementation shown in FIG. 4 shows a single instance of ANN 434 in the interests of conceptual clarity, more generally, ANN 434 may correspond to a single ANN or to an ensemble of multiple ANNs. For example, in one implementation, detection stage 435 may be implemented as a distinct instance of an ANN that feeds into prediction stage 437 implemented as another instance of an ANN. Thus, ANN 434 may correspond to one or more ANNs configured to operate in a complementary automated process to determine expression identifying data 494.

It is further noted that, as defined in the present application, ANN 434 is one or more machine learning engines implementing respective machine learning models designed to progressively improve their performance of a specific task. As known in the art, a "machine learning model" may refer to a mathematical model for making future predictions based on patterns learned from samples of data or "training data." Various learning algorithms can be used to map correlations between input data and output data (e.g., correlations). These correlations form the mathematical model that can be used to make future predictions on new input data. One type of learning algorithm includes supervised learning algorithms that learn correlations between input data and output data from training data that is labeled or otherwise annotated.

Expression determining software code 430 corresponds in general to expression determining software code 130, in FIG. 1, and those corresponding features may share any of the characteristics attributed to either corresponding feature by the present disclosure. That is to say, like expression determining software code 430, expression determining software code 130 may include features corresponding respectively to training module 432, expression predicting ANN 434 having detection stage 435 and prediction stage 437, and character archetype database 436 storing character archetypes 490*a* and 490*b*. In addition, training data 480 corresponds in general to training data 280, in FIG. 2A, and those corresponding features may share any of the characteristics attributed to either corresponding feature by the present disclosure.

With respect to the functionality of expression determining software code 130/430, it is noted that expression predicting ANN 434 may receive communication 492 in the form of verbal and/or nonverbal expressions by user 118, and uses communication 492 to predict an appropriate responsive expression by interactive social agent 116a or 116b. It is noted that, as defined in the present application, the term "nonverbal expression" may refer to vocalizations that are not language based, i.e., nonverbal vocalizations, as well as to physical gestures. Examples of nonverbal vocalizations may include a sigh, a murmur of agreement or disagreement, or a giggle, to name a few. By contrast to the emphasis on nonverbal as well as verbal expression in the present application, conventional state-of-the-art systems do not offer a generalized way to map between sets of nonverbal expressions.

According to various implementations, system 100 advantageously includes input module 150/350, which may obtain video and perform motion capture, using camera(s) 354e for example, in addition to capturing audio using microphone(s) 356. As a result, communication 492 from user 118 may be conveyed to detection stage 435 of expression predicting ANN 434. Detection stage 435 of expression predicting ANN 434 may include a mixture of convolution layers and sequential models. Detection stage 435 may receive audio, video, and motion capture features from input module 150/350 at the input layer and may detect different nonverbal expressions with respect to time.

It is noted that the detection performed by detection stage 435 can occur on a frame level or on an event level. In frame level detection, each frame is classified as a specific expression while in event level detection, an event or expression is detected as a whole. The occurrence or non-occurrence of these events may then be fed to prediction stage 437 for each time frame. Prediction stage 437 of expression predicting ANN 434 may have an architecture similar to that of detection stage 435, but focuses on the task of generating nonverbal expression tags as a temporal sequence, thereby determining the expressive behavior to be rendered using interactive social agent 116a or 116b. The behavior of interactive social agent 116a or 116b may also be based on other parameters, for example, the type of the expressions, the rate at which they are produced, the trigger or triggers that produce them, and so forth.

The performance of prediction stage 437 is substantially dictated by training data 280/480 used for training. However, in some implementations, interactive social agent 116a or 116b may assume the persona of a known character, such as the persona of a television (TV) character, movie character, video game character, or theme park character, for example. In those implementations, prediction stage 437 may also make use of the type of the character persona assumed by interactive social agent 116a or 116b to determine the expression identified by expression identifying data 494. For example, one of character archetypes 490a and 490b corresponding to the character persona assumed by interactive social agent 116a or 116b, for example, may be received as an input from character database 436, and may be used to determine expression identifying data 494.

It is also noted that the character archetype on which determination of expression identifying data 494 may be based may not be unique to the character persona assumed by interactive social agent 116a or 116b. That is to say character archetypes 490a and 490b may be generalized character traits shared by multiple specific characters. Examples of character archetypes may include heroic, villainous, faithful, deceptive, and the like.

The performance of system 100, in FIG. 1, will be further described by reference to FIG. 5, which presents flowchart 500 outlining an exemplary method for use by a system providing an interactive social agent. With respect to the method outlined in FIG. 5, it is noted that certain details and features have been left out of flowchart 500 in order not to obscure the discussion of the inventive features in the present application.

Figure 5:
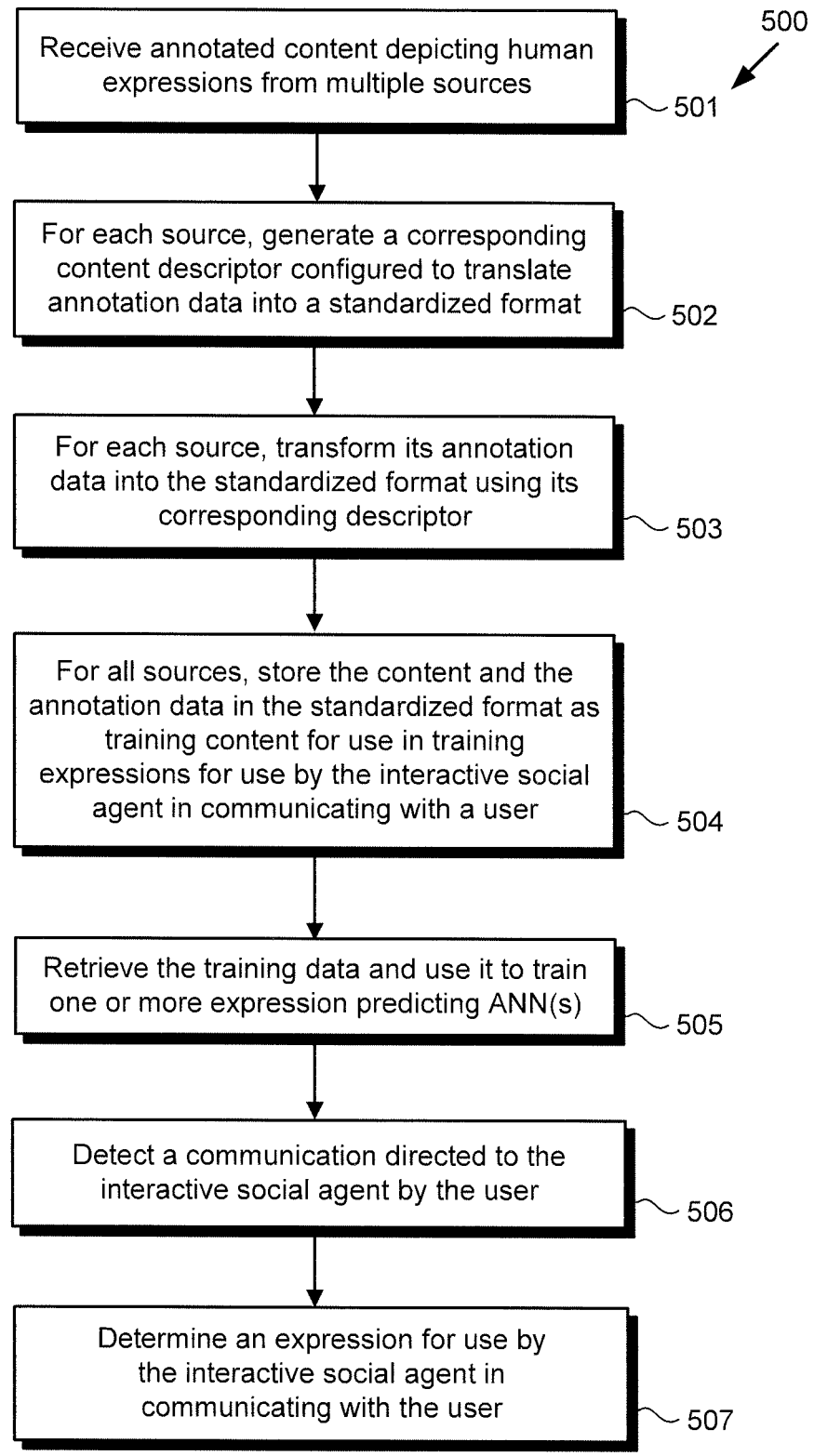
FIG. 5 shows a flowchart presenting an exemplary method for use by a system providing an interactive social agent, according to one implementation.

Referring to FIG. 5 in combination with FIGS. 1 and 2A, flowchart 500 begins with receiving content 221a, 221b, and 221c from respective annotation sources (i.e., corpora) 112a/212a, 112b/212b, and 112c/212c (action 501). As noted above, content 221a, 221b, and 221c may depict human expressions and may include annotation data describing the human expressions. However, and as also noted above, substantially the same or similar expressions may be captured as audio in some of content 221a, 221b, and 221c, but as video or still imagery in other of content 221a, 221b, and 221c. Moreover, different annotation tags may be applied to substantially the same or similar expressions among corpora 112a/212a, 112b/212b, and 112c/212c, and/or different annotation tagging criteria may have been applied when producing corpora 112a/212a, 112b/212b, and 112c/212c.

Content 221a, 221b, and 221c may be received from respective corpora 112a/212a, 112b/212b, and 112c/212c by training content standardization software code 120/220, executed by hardware processor 104. For example, as shown in FIG. 1, in some implementations, content 221a, 221b, and 221c included in corpora 112a/212a, 112b/212b, and 112c/212c, may be received from human interaction examples library 110, via communication network 111 and network communication links 115.

Flowchart 500 continues with, for each of content annotation sources or corpora 112a/212a, 112b/212b, and 112c/212c, generating corresponding content descriptor 260 configured to translate the annotation data included in content 221a, 221b, and 221c into a standardized data format (action 502). In other words, and referring to FIG. 2A, descriptor 260a corresponding to corpus 112a/212a, descriptor 260b corresponding to corpus 112b/212b, and descriptor 260c corresponding to corpus 112c/212c may be generated. Generation of descriptors 260a, 260b, and 260c may be performed by training content standardization software code 120/220, executed by hardware processor 104, and using content analysis module 222.

Flowchart 500 continues with, for each of content annotation sources or corpora 112a/212a, 112b/212b, and 112c/212c, transforming its annotation data into the standardized data format using its corresponding descriptor (action 503). Thus, descriptor 260a may be used to transform annotation data included in content 221a into the standardized format shown in FIGS. 2B and 2C, while descriptors 260b and 260c may be used to transform annotation data included in respective content 221b and 221c into the standardized format.

Transformation of the annotation data into the standardized data format in action 503 standardizes annotations applied to a variety of different content types, including audio content and video content. Transformation of the annotation data into the standardized data format advantageously results in the same set of annotation tags being applied to the content received from all of corpora 112a/212a, 112b/212b, and 112c/212c. Moreover, transformation of the annotation data into the standardized data format may also advantageously result in the same set of annotation tagging criteria being applied to the content received from all of corpora 112a/212a, 112b/212b, and 112c/212c. Transformation of content 221a, 221b, and 221c using respective descriptors 260a, 260b, and 260c may be performed by training content standardization software code 120/220, executed by hardware processor 104, and using content analysis module 222.

Flowchart 500 continues with, for all of content annotation sources or corpora 112a/212a, 112b/212b, and 112c/212c, storing the content included in content 221a, 221b, and 221c and the annotation data transformed into the standardized format in action 503 as training data 280/480 for use in training expressions for use by interactive social agent 116a or 116b in communicating with user 118 (action 504). As discussed above, training data 280/480 may be stored in training database 228 using data structure 281, shown in FIG. 2D. Storing of training data 280/480 may be performed by training content standardization software code 120/220, executed by hardware processor 104, and using data storage module 224.

In some implementations, flowchart 500 may conclude with storing of training content 280/480 in action 504, above. However, and as shown in FIG. 5, in other implementations, flowchart 500 continues with retrieving training data 280/480 from training database 228 and using training data 280/480 to train expression predicting ANN 434 (action 505). Training of expression predicting ANN 434 may proceed as discussed above with reference to FIG. 4. Training of expression predicting ANN 434 may be performed by expression determining software code 130/430, executed by hardware processor 104, and using training module 432.

It is noted that training content standardization software code 120/220 enables the adaptive selection of training data 280/480 for use in training expression predicting ANN 434. This results in the ability to tailor the training of expression predicting ANN 434 based on known characteristics of the input data. By training expression predicting ANN 434 in this way, there is a commitment to having the same input features available at execution time. It is further noted that the features derived at execution time need not be persistently stored. Thus, expression determining software code 130/430 can be used to determine an expression for use by interactive social agent 116a or 116b in communicating with user 118 based on the behavior of user 118, but may discard the raw data used to capture and detect the behavior of user 118 as soon as that expression is determined.

Flowchart 500 can continue with detecting communication 492 directed to interactive social agent 116a or 116b by user 118 (action 506). In some implementations, as discussed above, input module 150/350 may include keyboard 152 or a touchscreen display corresponding to display 108. In those implementations, communication 492 may be received as an input to keyboard 152 or display 108. In implementations in which input module 150/350 includes one or more sensors 354, communication 492 may be received as sensor data produced by one or more of sensors 354. In addition, or alternatively, in some implementations input module 150/350 may include microphone(s) 356 and ADC 358. In those latter implementations, communication 492 may be converted by ADC 358 from speech of user 118 received by microphone(s) 356.

Thus, as discussed above, communication 492 may be captured using one or more sensors 354 and/or microphone(s) 356 of input module 150/350, and may be conveyed to detection stage 435 of expression predicting ANN 434. As a result, detection of communication 492 may be performed by expression predicting ANN 434 of expression determining software code 130/430, executed by hardware processor 104, and using detection stage 435.

Flowchart 500 can conclude with determining the expression for use by interactive social agent 116a or 116b to communicate with user 118 (action 507). As discussed above, the expression identified by expression identifying data 494 may be determined by expression predicting ANN 434 of expression determining software code 130/430, executed by hardware processor 104, and using prediction stage 435. As further discussed above, in some implementations, expression identifying data 494 may be determined based on a character archetype of one of a TV character persona, a movie character persona, a video game character persona, and a theme park character persona assumed by the interactive social agent.

Figure 6:
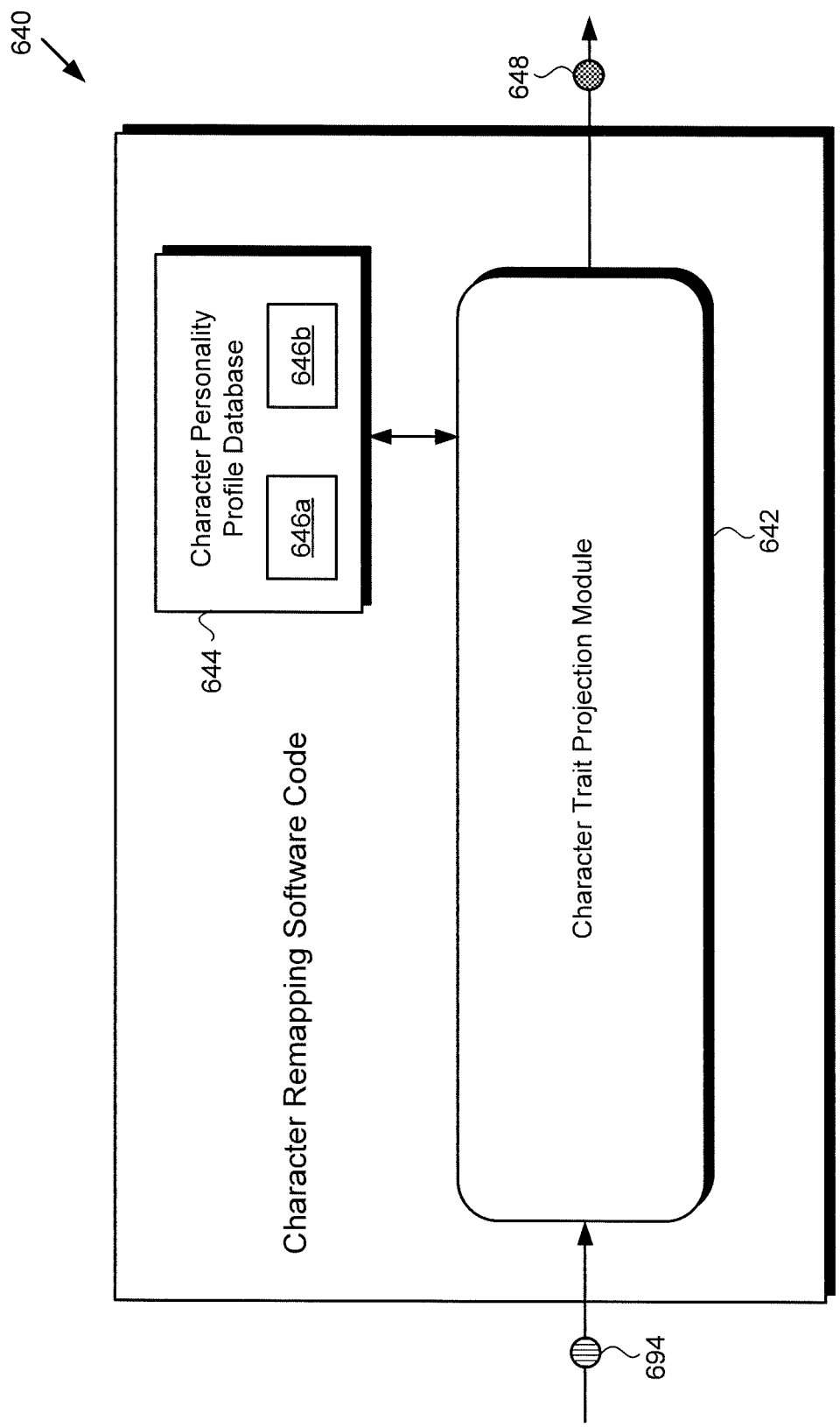
FIG. 6 shows a more detailed diagram of a character remapping software code suitable for use in a system providing an interactive social agent, according to one implementation.

FIG. 6 shows exemplary character remapping software code 640 suitable for execution by hardware processor 104 of system 100, in FIG. 1, according to one implementation. As shown in FIG. 6, character remapping software code 640 may include character trait projection module 642 and character personality profile database 644 storing personality profiles 646a and 646b. Also shown in FIG. 6 are expression identifying data 694 received by character remapping software code 640 from expression determining software code 130/430, and modified expression 648 output by character remapping software code 640.

Character remapping software code 640 corresponds in general to character remapping software code 140, in FIG. 1, and those corresponding features may share any of the characteristics attributed to either corresponding feature by the present disclosure. That is to say, like character remapping software code 640, character remapping software code 140 may include features corresponding respectively to character trait projection module 642 and character personality profile database 644 storing personality profiles 646a and 646b. In addition, expression identifying data 694 corresponds in general to expression identifying data 494, in FIG. 4, and those corresponding features may share any of the characteristics attributed to either corresponding feature by the present disclosure.

It is noted determination of expression identifying data 494/694 by expression predicting ANN 434 is performed in a way that is substantially agnostic with respect to a character persona assumed by interactive social agent 116a or 116b. Although, as discussed above, determination of expression identifying data 494/694 may be influenced by the character archetype of the character persona assumed by interactive social agent 116a or 116b, it typically does not take into account the personality quirks or idiosyncrasies of that character persona. Character remapping software code may remedy the generic aspects of the expression identified by expression identifying data 494/694 by accounting for those idiosyncrasies.

For example, where expression identifying data 494/694 specifies the facial expression "smile" across three time units (i.e., smile-smile-smile), and where personality profile 646a of the character assumed by interactive social agent 116a or 116b describes a silly or goofy character, the expression smile-smile-smile might be remapped to modified expression (sillygrin-sillygrin-sillygrin) 648. By contrast, where personality profile 646b of the character assumed by interactive social agent 116a or 116b is that of an evil villain, the expression smile-smile-smile might be remapped to modified expression (sneer-sneer-sneer) 648.

Figure 7:
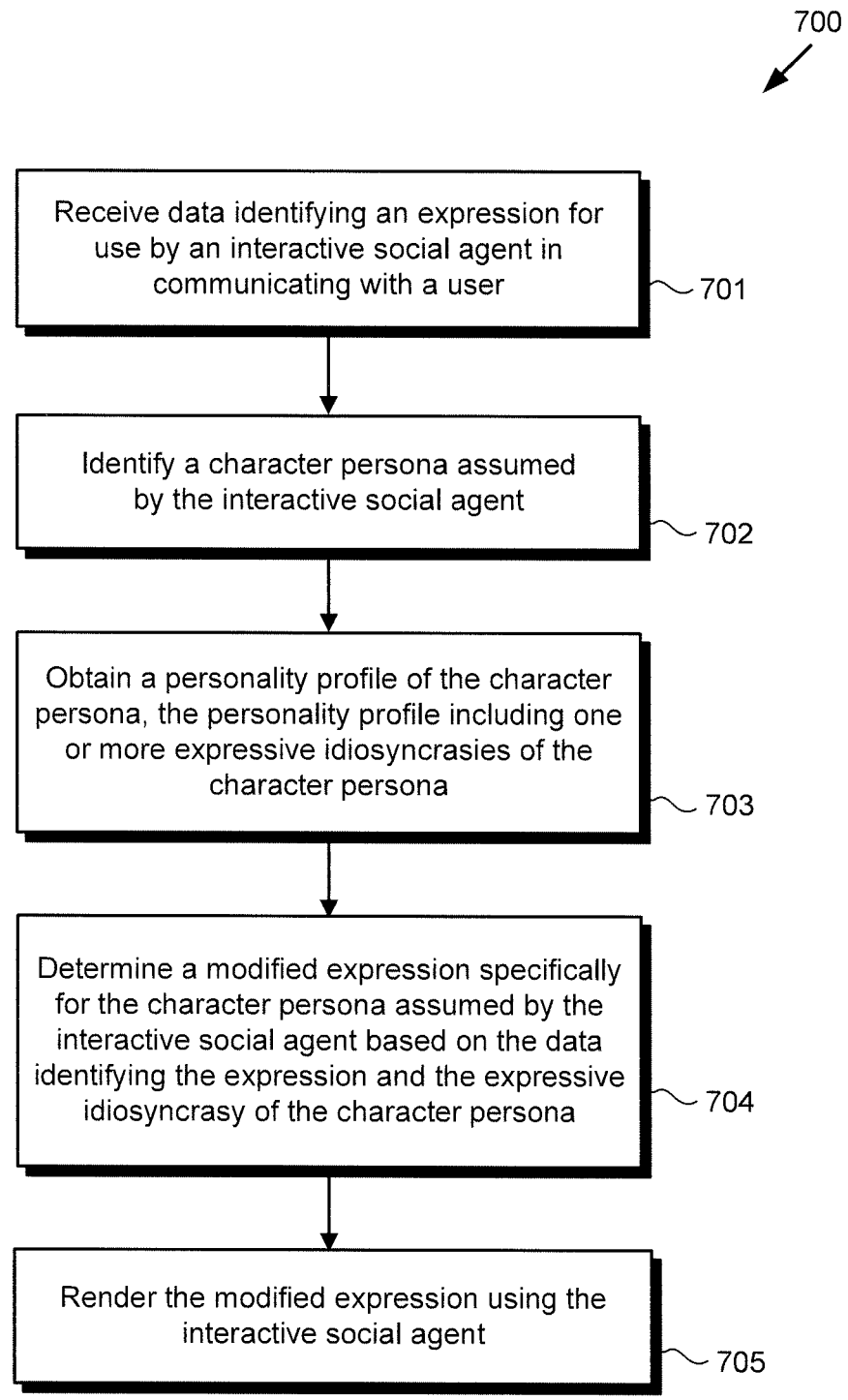
FIG. 7 shows a flowchart presenting another exemplary method for use by a system providing an interactive social agent.

FIG. 7 shows flowchart 700 outlining another exemplary method for use by a system providing an interactive social agent. With respect to the method outlined in FIG. 7, it is noted that certain details and features have been left out of flowchart 700 in order not to obscure the discussion of the inventive features in the present application.

Referring to FIGS. 1, 4, and 6 in conjunction with FIG. 7, flowchart 700 begins with receiving data 494/694 identifying an expression for use by interactive social agent 116a or 116b in communicating with user 118 (action 701). As discussed above, action 701 may be performed by character remapping software code 140/640, executed by hardware processor 104.

Flowchart 700 continues with identifying a character persona assumed by interactive social agent 116a or 116b (action 702). The identity of the character persona assumed by interactive social agent 116a or 116b may be received as data provided to character remapping software code 140/640 by interactive social agent 116a or 116b, for example. Thus, action 702 may be performed by character remapping software code 140/640, executed by hardware processor 104.

Flowchart 700 continues with obtaining personality profile 646a or 646b of the character persona assumed by interactive social agent 116a or 116b, personality profile 646a or 646b including one or more expressive idiosyncrasies of the character persona (action 703). Action 703 may be performed by character trait projection module 642 of character remapping software code 140/640, executed by hardware processor 104, and using character personality profile database 644.

Flowchart 700 continues determining modified expression 648 specifically for the character persona assumed by interactive social agent 116a or 116b based on data 494/694 identifying the expression determined by expression determining software code 130/430 and the one or more expressive idiosyncrasies included in personality profile 646a or 646b (action 704). As discussed above, for example, where personality profile 646a or 646b describes a particular silly or goofy character, data 494/694 identifying the expressions smile-smile-smile may be modified to expression 648 as sillygrin-sillygrin-sillygrin. Action 704 may be performed by character trait projection module 642 of character remapping software code 140/640, executed by hardware processor 104.

Flowchart 700 can conclude with rendering modified expression 648 using interactive social agent 116a or 116b (action 705). Expression 648 may be rendered via output module 114 by character remapping software code 140/640 of system 100, executed by hardware processor 104. In some implementations, expression 648 may take the form of a language based verbal communication by interactive social agent 116a or 116b. Moreover, in some implementations, output module 114 may include display 108. In those implementations, expression 648 may be rendered as text on display 108.

However, in other implementations expression 648 may include a non-verbal communication by interactive social agent 116a or 116b, either instead of, or in addition to a language based communication. For example, in some implementations, output module 114 may include an audio output device, as well as display 108 showing an avatar or animated character as a representation of interactive social agent 116a. In those implementations, expression 648 may be rendered as one or more of speech by the avatar or animated character, a nonverbal vocalization, a facial expression by the avatar or animated character, and a gesture by the avatar or animated character.

Furthermore, and as shown in FIG. 1, in some implementations, system 100 may include interactive social agent 116b in the form of a robot or other machine capable of simulating expressive behavior and including output module 114. In those implementations, expression 648 may be rendered as one or more of speech by interactive social agent 116b, a facial expression by interactive social agent 116b, and a gesture by interactive social agent 116b.

Thus, the present application discloses systems and methods for performing automated determination of expressions for an interactive social agent. As discussed above, the solutions disclosed in the present application advantageously enable the interpretation of contextual inputs including nonverbal cues in order to determine naturalistic expressions for use by the interactive social agent in communicating with a user.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system providing an interactive social agent, the system comprising:
   a computing platform including a hardware processor and a system memory;
   a training content standardization software code stored in the system memory;
   the hardware processor configured to execute the training content standardization software code to:
      receive a content depicting human expressions and including annotation data describing the human expressions from each of a plurality of content annotation sources;
      for each of the plurality of content annotation sources, generate a corresponding content descriptor configured to translate the annotation data into a standardized data format;
      for each of the plurality of content annotation sources, transform the annotation data into the standardized data format using the corresponding content descriptor; and
      for all of the plurality of content annotation sources, store the content and the annotation data in the standardized format as a training data in a training database for use in training an expression by the interactive social agent in communicating with a user.

2. The system of claim 1, wherein transformation of the annotation data into the standardized data format standardizes annotations applied to a plurality of different content types including audio content and video content.

3. The system of claim 1, wherein transformation of the annotation data into the standardized data format results in a same set of annotation tags being applied to the content received from all of the plurality of content sources.

4. The system of claim 1, wherein transformation of the annotation data into the standardized data format results in a same set of annotation tagging criteria being applied to the content received from all of the plurality of content sources.

5. The system of claim 1, further comprising an expression determining software code including at least one expression predicting artificial neural network (ANN) stored in the system memory, wherein the hardware processor is further configured to execute the expression determining software code to:
  retrieve the training data including the content and the annotation data in the standardized format from the training database;
  train the at least one expression predicting ANN using the training data;
  detect a communication directed to the interactive social agent by the user, using the at least one expression predicting ANN; and
  determine an expression for use by the interactive social agent in communicating with the user, using the at least one expression predicting ANN.

6. The system of claim 5, wherein the hardware processor executes the expression determining software code to determine the expression for use by the interactive social agent in communicating with the user based on a character archetype of one of a TV character persona, a movie character persona, a video game character persona, and a theme park character persona assumed by the interactive social agent.

7. A method for use by a system providing an interactive social agent, the system including a computing platform having a hardware processor and a system memory storing a training content standardization software code, the method comprising:
  receiving, by the training content standardization software code executed by the hardware processor, a content depicting human expressions and including annotation data describing the human expressions from each of a plurality of content annotation sources;
  for each of the plurality of content annotation sources, generating, by the training content standardization software code executed by the hardware processor, a corresponding content descriptor configured to translate the annotation data into a standardized data format;
  for each of the plurality of content annotation sources, transforming, by the training content standardization software code executed by the hardware processor, the annotation data into the standardized data format using the corresponding content descriptor; and
  for all of the plurality of content annotation sources, storing, by the training content standardization software code executed by the hardware processor, the content and the annotation data in the standardized format as a training data in a training database for use in training an expression for use by the interactive social agent in communicating with a user.

8. The method of claim 6, wherein transforming the annotation data into the standardized data format standardizes annotations applied to a plurality of different content types including audio content and video content.

9. The method of claim 6, wherein transformation of the annotation data into the standardized data format results in a same set of annotation tags being applied to the content received from all of the plurality of content sources.

10. The method of claim 6, wherein transformation of the annotation data into the standardized data format results in a same set of annotation tagging criteria being applied to the content received from all of the plurality of content sources.

11. The method of claim 6, wherein the system memory further stores an expression determining software code including at least one expression predicting artificial neural network (ANN), the method further comprising:
  retrieving, by the expression determining software code executed by the hardware processor, the training data including the content and the annotation data in the standardized format from the training database;
  training the at least one expression predicting ANN, by the expression determining software code executed by the hardware processor, using the training data;
  detecting, by the expression determining software code executed by the hardware processor, a communication directed to the interactive social agent by the user, using the at least one expression predicting ANN; and
  determining, by the expression determining software code executed by the hardware processor, an expression for use by the interactive social agent in communicating with the user, using the at least one expression predicting ANN.

12. The method of claim 11, wherein determining the expression for use by the interactive social agent in communicating with the user is based on a character archetype of one of a TV character persona, a movie character persona, a video game character persona, and a theme park character persona assumed by the interactive social agent.

13. A system providing an interactive social agent, the system comprising:
  a computing platform including a hardware processor and a system memory;
  a character remapping software code stored in the system memory;
  the hardware processor configured to execute the character remapping software code to:
    receive a data identifying an expression for use by the interactive social agent in communicating with a user;
    identify a character persona assumed by the interactive social agent;
    obtain a personality profile of the character persona, the personality profile including at least one expressive idiosyncrasy of the character persona;
    determine a modified expression specifically for the character persona assumed by the interactive social agent based on the data identifying the expression and the expressive idiosyncrasy of the character persona; and
    render the modified expression using the interactive social agent.

14. The system of claim 13, wherein the character persona is a persona of one of a TV character, a movie character, a video game character, and a theme park character.

15. The system of claim 13, further comprising an expression determining software code including at least one expression predicting artificial neural network (ANN) stored in the system memory, wherein the hardware processor is further configured to execute the expression determining software code to:
  detect a communication directed to the interactive social agent by the user, using the at least one expression predicting ANN;
  determine the expression for use by the interactive social agent in communicating with the user, using the at least one expression predicting ANN; and
  output the data identifying the expression to the character remapping software code.

16. The system of claim 15, wherein the hardware processor executes the expression determining software code to determine the expression for communication by the interactive social agent based on a character archetype of the character persona assumed by the interactive social agent.

17. A method for use by a system providing an interactive social agent, the system including a computing platform having a hardware processor and a system memory storing a character remapping software code, the method comprising:
- receiving, by the character remapping software code executed by the hardware processor, a data identifying an expression for use by the interactive social agent in communicating with a user;
- identifying, by the character remapping software code executed by the hardware processor, a character persona assumed by the interactive social agent;
- obtaining, by the character remapping software code executed by the hardware processor, a personality profile of the character persona, the personality profile including at least one expressive idiosyncrasy of the character persona;
- determining, by the character remapping software code executed by the hardware processor, a modified expression specifically for the character persona assumed by the interactive agent based on the data identifying the expression and the expressive idiosyncrasy of the character persona; and
- rendering, by the character remapping software code executed by the hardware processor, the modified expression using the interactive social agent.

18. The method of claim 17, wherein the character persona is a persona of one of a TV character, a movie character, a video game character, and a theme park character.

19. The method of claim 17, further comprising an expression determining software code including at least one expression predicting artificial neural network (ANN) stored in the system memory, the method further comprising:
- detecting, by the expression determining software code executed by the hardware processor, a communication directed to the interactive social agent by the user, using the at least one expression predicting ANN;
- determining, by the expression determining software code executed by the hardware processor, the expression for use by the interactive social agent in communicating with the user, using the at least one expression predicting ANN; and
- outputting, by the expression determining software code executed by the hardware processor, the data identifying the expression to the character remapping software code.

20. The method of claim 19, wherein determining the expression for communication by the interactive social agent based on a character archetype of the character persona assumed by the interactive social agent.

* * * * *